US007809361B2

(12) United States Patent
Ekberg et al.

(10) Patent No.: US 7,809,361 B2
(45) Date of Patent: Oct. 5, 2010

(54) ADDRESS PRIVACY IN SHORT-RANGE WIRELESS COMMUNICATION (75) Inventors: Jan-Erik Ekberg, Vantaa (FI); Mauri Honkanen, Tampere (FI); Päivi M. Ruuska, Tampere (FI); Jukka Reunamäki, Tampere (FI); Antti Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 1143 days.

(21) Appl. No.: 11/454,956

(22) Filed: Jun. 19, 2006

(65) Prior Publication Data
US 2007/0293197 A1 Dec. 20, 2007

(51) Int. Cl.
*H04M 11/10* (2006.01)
(52) U.S. Cl. .................. 455/414.1; 455/410; 455/411; 713/151; 713/152; 713/162
(58) Field of Classification Search .............. 455/414.1, 455/410, 411; 713/151, 152, 162
See application file for complete search history.

(56) References Cited

U.S. PATENT DOCUMENTS

| 5,442,702 A * | 8/1995 | van Ooijen et al. ......... 713/162 |
| 2002/0131445 A1 | 9/2002 | Skubic et al. |
| 2002/0174364 A1 | 11/2002 | Nordman et al. |
| 2002/0176412 A1* | 11/2002 | Racz et al. .................. 370/389 |
| 2004/0038645 A1 | 2/2004 | Rcunamaki et al. |
| 2004/0266494 A1 | 12/2004 | Ruuska et al. |
| 2005/0014468 A1 | 1/2005 | Salokannel et al. |
| 2005/0195814 A1* | 9/2005 | Hagiwara et al. ........... 370/389 |
| 2007/0206535 A1* | 9/2007 | Sood et al. .................. 370/331 |

FOREIGN PATENT DOCUMENTS

WO  WO 2004/030394 A1  4/2004

OTHER PUBLICATIONS

"MAC Distributed Security Proposal", (Certicomm Corp.) IEEE P802.15 Working Group for Wireless Personal Area Networks (WPANs); Mar. 8, 2002; XP-40389946, pp. 1-15.
EPO Communication mailed in EP on Dec. 12, 2009, 4 pages.
Specification of the Bluetooth System, Specification vol. 1, Wireless Connections made easy, Core, v1. O B, pp. 1, 47-66, 143-178, chapters 4. Packets, 13. Bluetooth Addressing, 14. Bluetooth Security; Specification of the Bluetooth System; Dec. 1, 1999; p. Complete57, XP002211422.

* cited by examiner

*Primary Examiner*—Nghi H Ly
*Assistant Examiner*—Amancio Gonzalez
(74) *Attorney, Agent, or Firm*—Locke Lord Bissell & Liddell

(57) ABSTRACT

A security enhancing system for creating temporary identification information used to mask actual identification in a wireless communication device. The temporary identification information conforms to a standard usable by at least one wireless communication medium, and may be used by other devices in communicating with the wireless communication device, however, only other devices possessing secret address component information may determine the actual identity of the masked wireless communication device. The temporary identification information may further be recompiled when a threshold condition is satisfied.

29 Claims, 10 Drawing Sheets

ADDRESS PRIVACY IN SHORT-RANGE WIRELESS COMMUNICATION

BACKGROUND OF THE INVENTION

The present invention relates to a system for enhancing security in a device communicating via a wireless communication medium, and more specifically to a system for creating a temporary private address that prevents the disclosure of the permanent address of a wireless communication device when communicating over a short-range wireless connection.

DESCRIPTION OF PRIOR ART

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

The previously described assortment of embedded features currently available in WCDs allow users to conduct transactions with many different devices over a multitude of communication mediums. These transactions may occur at a user's discretion (e.g., through a user initiated action), or may trigger automatically when a certain mode is activated in a WCD permitting it to be discovered and contacted by other wireless apparatuses. In this way, a WCD may be involved in continuous active communications with other wireless devices without the knowledge of the user. These communication scenarios may present both benefit and concern in today's technology-dependant society.

Depending on the technology employed, a person intentionally activating a wireless connection (e.g., to gain access to a network, to wirelessly connect an external device such as a headset, to transmit file information from one device to another, etc.) must first present device and/or user identification information in order to commence communication. While this information is primarily intended for a target receiving device, there is no certainty that the target device is the only device listening to the wireless transaction. In fact, every other device within transmission of the WCD is also receiving this information. Under normal circumstances, the other uninvolved wireless devices would ignore this information. However, these transmissions may also be recorded by a listening device, allowing a possible wrongdoer to gain identification information about a person which could be employed to later locate a person or access their data.

Further, while a user may enable a WCD to automatically download useful information, the fact that previously unknown devices may connect at will to their WCD presents another security issue. A person with mischievous or malicious intent could use any information obtained from a user's WCD to learn sensitive or confidential information about the user, obtain sensitive or confidential information related to a user's employment (e.g., obtain work or other similar documents), and possibly even track the current location of a user. As a result, a people utilizing WCDs must continually weigh whether they want to expose themselves to a potential threat against using the beneficial communication features included in their device.

What is therefore needed is a way to mask the actual identification information of a WCD so that it may both be changed at will, and despite this continual variation, allow another trusted device to determine the true identity of the WCD. In this way, it would be impossible for others to determine the presence of the WCD, since identification information transmitted by the WCD in making or responding to a request for a communication would be constantly variable.

SUMMARY OF INVENTION

The present invention includes at least a method, terminal device, computer program, chipset and system for creating temporary identification information used to mask actual identification information in a wireless communication device. The temporary identification information, or private address, may be utilized by other wireless devices in communicating with the wireless communication device, however, only other devices possessing secret address component information may determine the actual identity of the masked device.

A secret address component may first be maintained in a wireless communication device. This secret address component may be shared between a group of one or more trusted wireless communication devices. A temporary pseudo-random address may then be compiled, based on the secret address component, which is utilized by the wireless communication device as an identifier to other devices. The temporary pseudo-random address may be determined by creating a random address component that is tested using the secret address component. The random address component must pass both an entropy R( ) function test and an encryption E( ) function test before it may be used in the address. At least two random address components are put through this process and concatenated in order to form a temporary pseudo-random address.

The pseudo random address may further include a signal identifying it as a pseudo-random address. This signal may take the form of a bit in the address set in a predetermined state. A device in the group of one or more trusted wireless communication devices that is searching for a particular wireless communication device may interpret this signal in order to determine whether the address currently received from a responding device is a pseudo-random address. The searching device may then test the temporary pseudo-random address to determine if it is masking the desired device. The temporary pseudo random address may then be split back into its random address components, which are tested against the secret address component known to the searching wireless communication device. If both random address components pass the test, then the desired wireless location device has been located.

The pseudo-random address may further be recompiled based on a condition set in the wireless communication device. The condition may be based on time, connection, duration, etc. When the condition is true, the pseudo-random address process may reinitiate to create a new pseudo-random address. The new pseudo-random address may then be installed as the identification address of the device during a time when communication is inactive for at least the particular short-range wireless medium corresponding to the identification address.

DESCRIPTION OF DRAWINGS

The invention will be further understood from the following detailed description of a preferred embodiment, taken in conjunction with appended drawings, in which.

DESCRIPTION OF PREFERRED EMBODIMENT

While the invention has been described in preferred embodiments, various changes can be made therein without departing from the spirit and scope of the invention, as described in the appended claims.

I. Wireless Communication over Different Communication Networks

Figure 1:
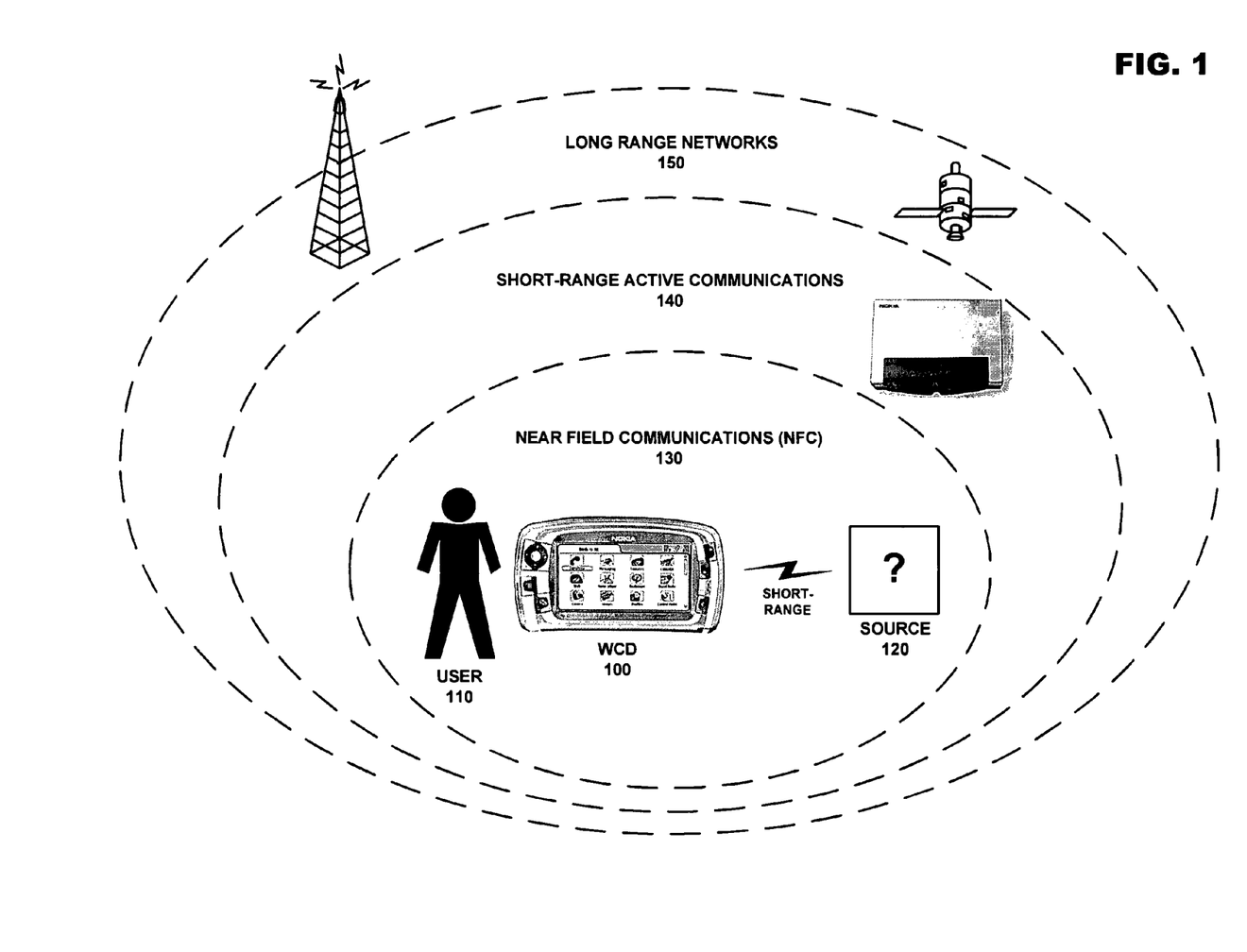
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

In view of the above, it becomes easy to understand the need for a variety of different communication resources combined into a single WCD. Since these types of devices are being used as replacements for a variety of conventional communications means, including land-land telephones, low-functionality cellular handsets, laptops enabled with wireless communications, etc., the devices must be able to easily adapt to a variety of different applications (e.g., voice communications, business programs, GPS, Internet communications, etc.) in a variety of different environments (e.g. office, automobile, outdoors, arenas, shops, etc.)

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
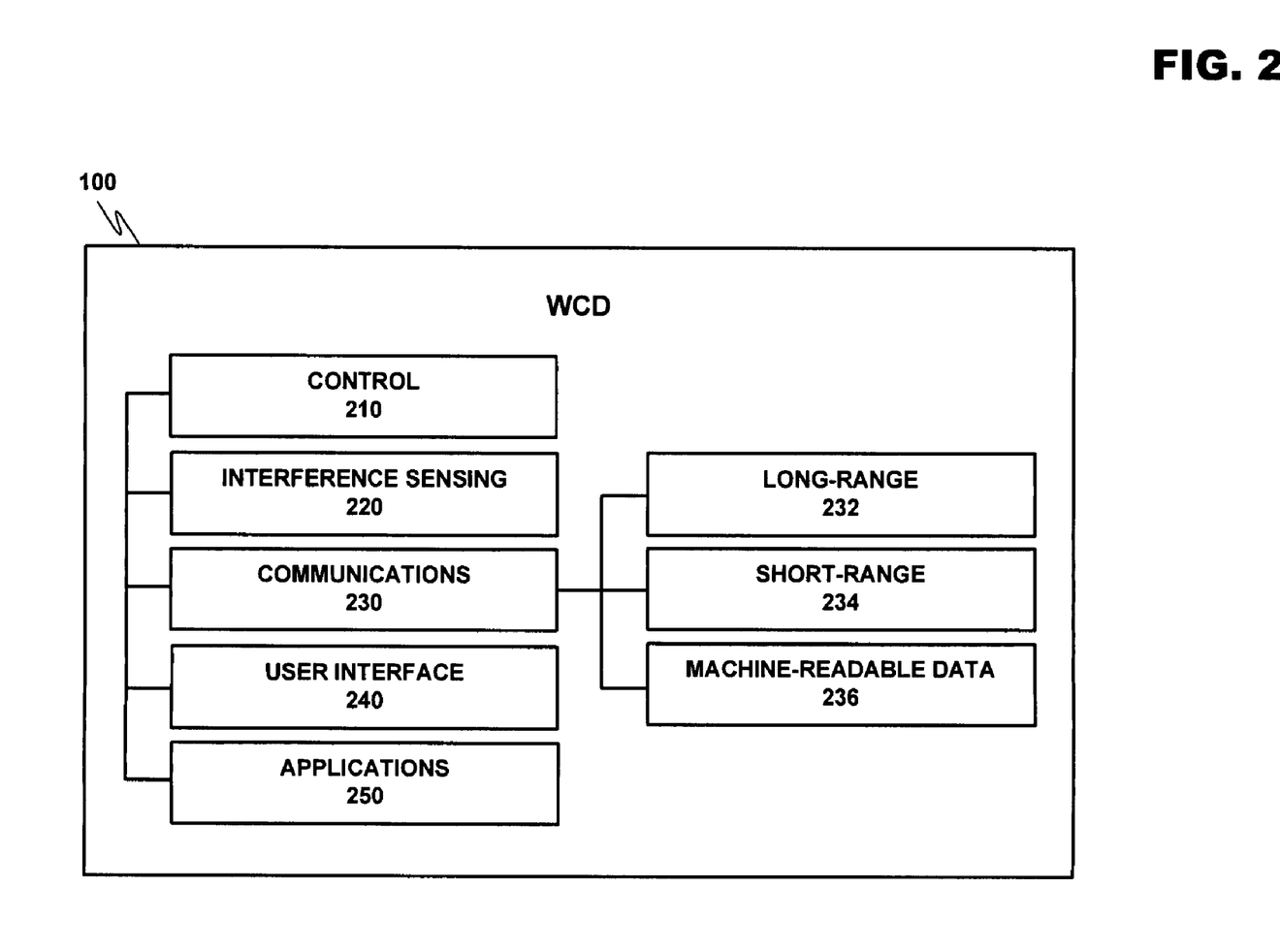
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
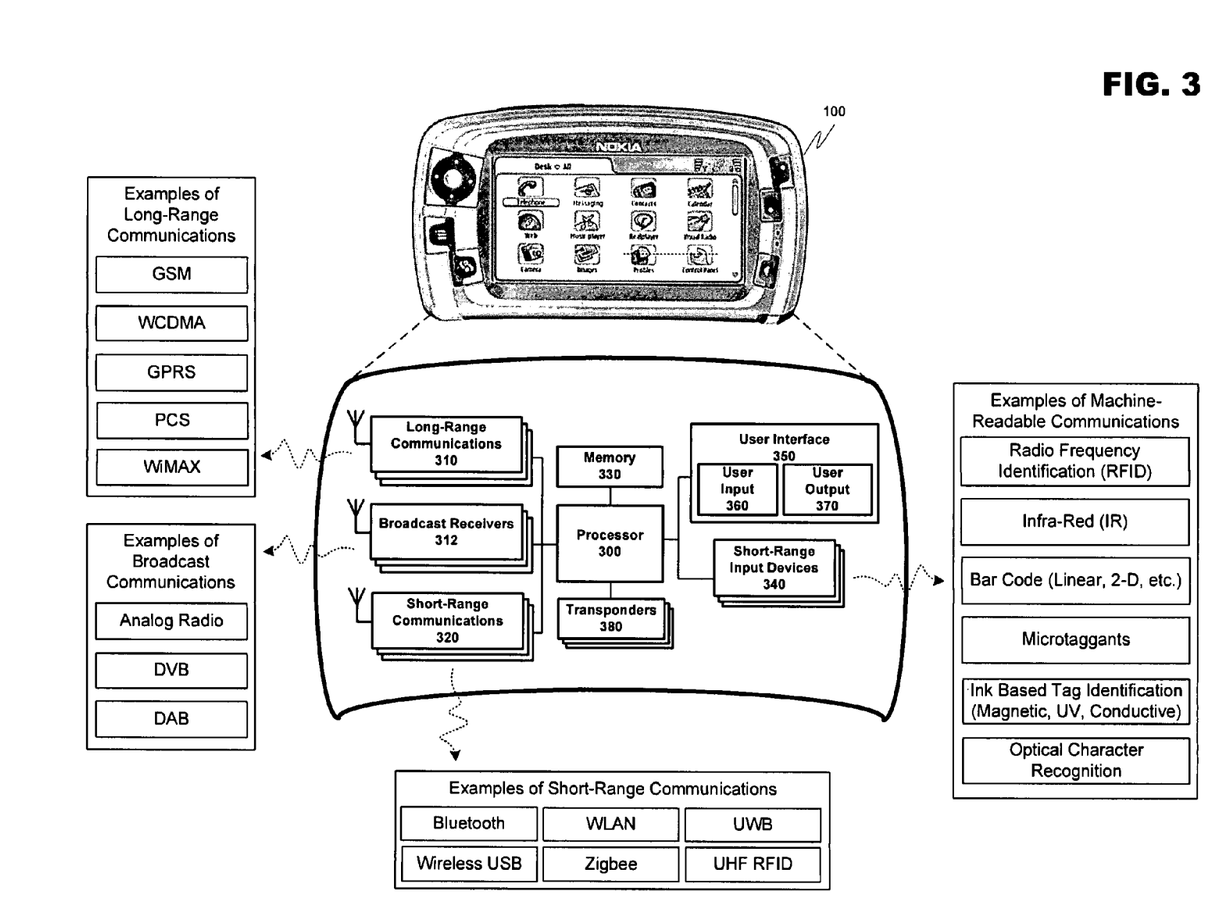
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, BluLite, WLAN, UWB, Zigbee, UHF RFID, and Wireless USB connections. Accordingly, short-range communications 320 performs functions related to the establishment of short-range connections, as well as processing related to the transmission and reception of information via such connections. Short-range communications 320 may be composed of one or more subsystem made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Communication Between Wireless Communication Devices and the Vulnerabilities Therein Referring now to FIG. 4, an exemplary communication between two wireless communication devices is disclosed. In this specification, Bluetooth™ communication is often used for the sake of example, however, the present invention is applicable to any type of short-range wireless communication wherein a device identification is returned in response to a request to communicate. Common examples of applicable communication mediums may include Bluetooth™, BluLite/LEE (a scaled down version of Bluetooth™ usable with low power devices), WLAN, wireless USB, etc.

Figure 4:
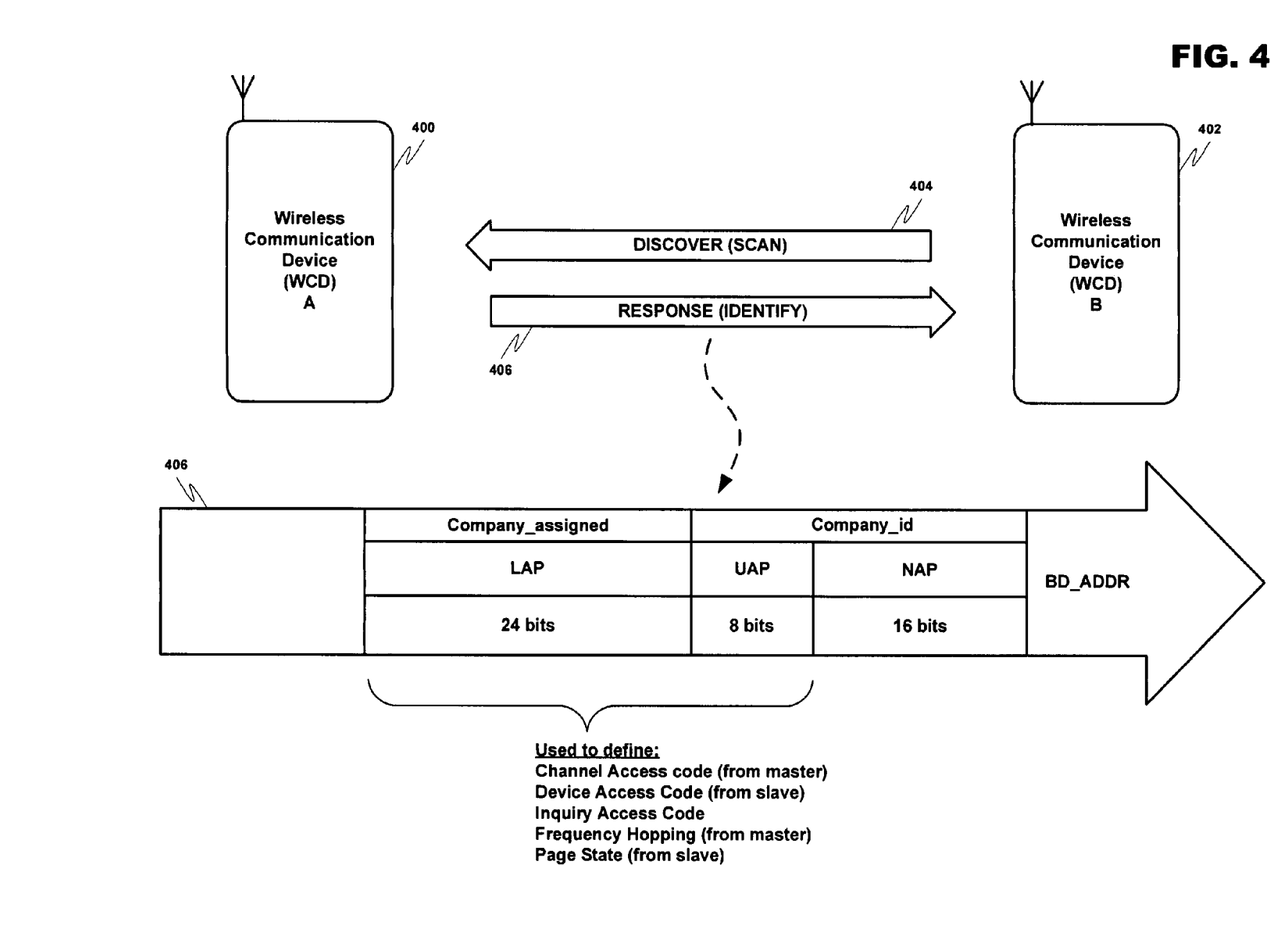
FIG. 4 discloses an exemplary communication between two wireless communication devices in accordance with at least one embodiment of the present invention.

WCD A 400 and WCD B 402 are establishing communication in FIG. 4. In this example, WCD B 402 is initiating the communication by polling, or discovering, WCD A 400

(shown at 404). The poll may, for example, advertise information for distribution to any neighboring device, or may invite communication from a specific WCD. In response, WCD A 400 may transmit information derived from its Bluetooth™ device address (BD_ADDR) shown at 406. The standard BD_ADDR is made up of a lower address part (LAP) consisting of 24 bits, an upper address part (UAP) consisting of 8 bits, and a non-significant address part (NAP) consisting of 16 bits. The LAP forms the company assigned device ID for WCD A 400, and the UAP and NAP combined form the company ID. The information in the LAP and UAP may be utilized, alone or in combination, to derive important communication information, such as the Bluetooth™ access codes used in wireless messages sent between the devices.

The Bluetooth™ access code is at least the first part of each communication packet transmitted between the devices. Some of the access codes used in Bluetooth™ are uniquely determined by the LAP contained in the BD_ADDR. There are at least three different distinct access codes: Channel Access Code (CAC)—the CAC is derived from the LAP of WCD B 402 (master device), Device Access Code (DAC)—the DAC is derived from the LAP of WCD A 400 (slave device), and Inquiry Access Code (IAC)—Can be in two different forms, and is derived from special dedicated LAP values not related to any specific BD_ADDR.

The CAC and DAC may be used to track the location of a WCD, and accordingly, the current whereabouts of a specific user carrying the device may be obtained. Furthermore, the entire BD_ADDR (LAP, UAP and NAP) may be included in Frequency Hop Synchronization (FHS) packets sent in order to coordinate device communication. More specifically, the frequency-hopping scheme in Bluetooth™ is determined by a hopping sequence. The hopping scheme calculation uses different input parameters. To establish the connection state, the LAP and the four least significant bits in the UAP of WCD B 402 may be used. For the page state, the LAP/UAP of the paged unit (e.g., WCD A 400) is used. This may make it possible to obtain the LAP and four bits in UAP based on tracking the hopping scheme of a communicating device. As a result, significant parts of the master device address could be revealed during a connection.

Figure 5A:
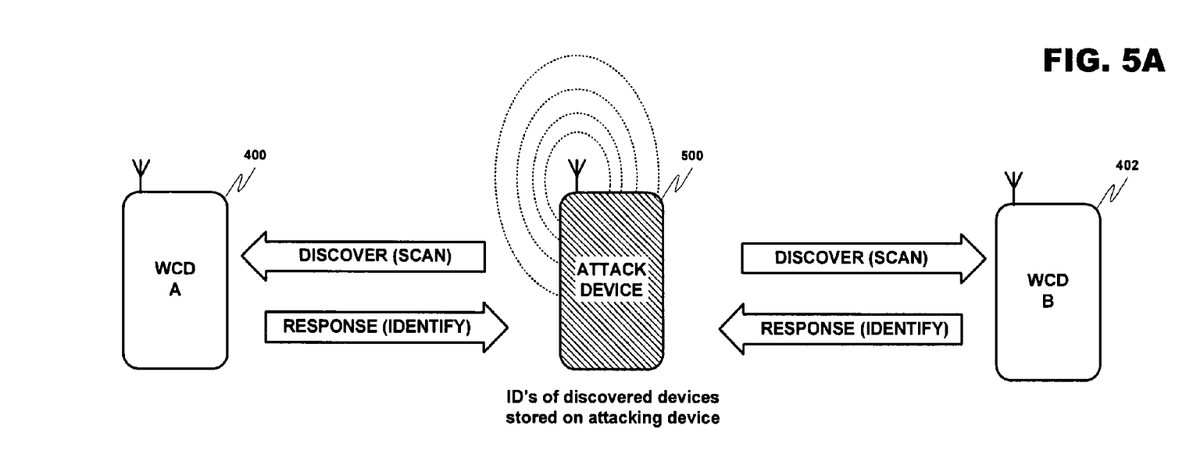
FIG. 5A discloses an example of an active accumulation of device information by an attacking wireless communication device against other wireless communication devices which is a motivation for at least one embodiment of the present invention.

FIG. 5A gives an example scenario of an "attack" device 500 obtaining information from one or more devices present within effective transmission range. Attack device 500 may actively poll for connection with other devices in the immediate area. This polling may occur over a short-range wireless medium 140 such as Bluetooth™, or other similar medium as previously described. If WCD A 400 and WCD B 402 are left in a receptive or discoverable mode, these devices may automatically respond and identify themselves to attack device 500. As a result, attack device 500 may store the received identification information for use in tracking these devices and/or possibly accessing the contents of these devices at a later time. Therefore, attack device 500 in this example actively seeks out devices in a permissive mode on which to prey, and may be positioned near an Internet access point (AP) or other highly-trafficked communication area where users would be more likely to have the communication features enabled in their WCD 100.

Figure 5B:
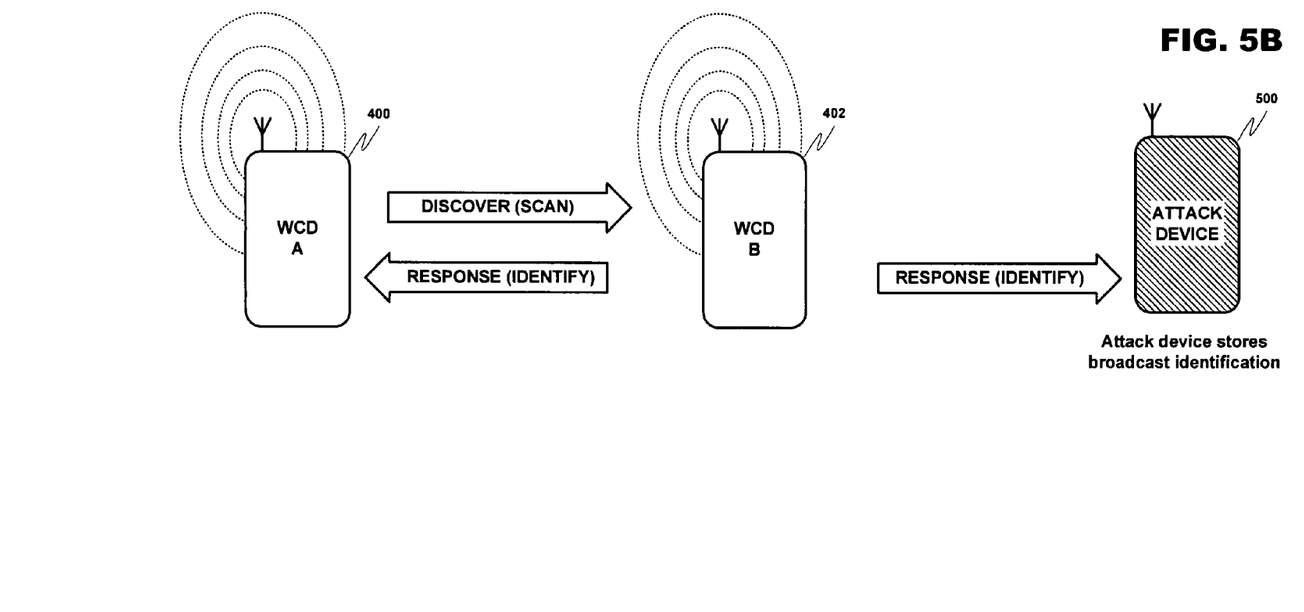
FIG. 5B discloses an example of a passive accumulation of device information by an attacking wireless communication device against other wireless communication devices which is a further motivation for at least one embodiment of the present invention.

As is further disclosed in FIG. 5B, attack device 500 does not have to actively send polling or inquiry messages in order to obtain identification information from another device. In this scenario, WCD A 400 and WCD B 402 are actively engaged in a wireless transaction. As previously described, the BD_ADDR of the devices, or identifiable parts of this address in the form of access codes, will be exchanged between the two devices. However, it is important to keep in mind that this is wireless, not wired communication. Information does not travel exclusively from WCD A 400 to WCD B 402 and vice versa. The identification information is broadcast, and may be picked up by any device within effective transmission range of the particular wireless medium. Normally, this information is ignored by another WCD 100 if it is not addressed to it. However, attack device 500 may lurk in the background and accumulate this information without having to actively connect to another communication device. As a result, attack device 500 may be able to secretly obtain identification information that may be in turn be used in a malicious manner to track the whereabouts of a particular device, or alternatively, to gain access to private information.

Figure 5C:
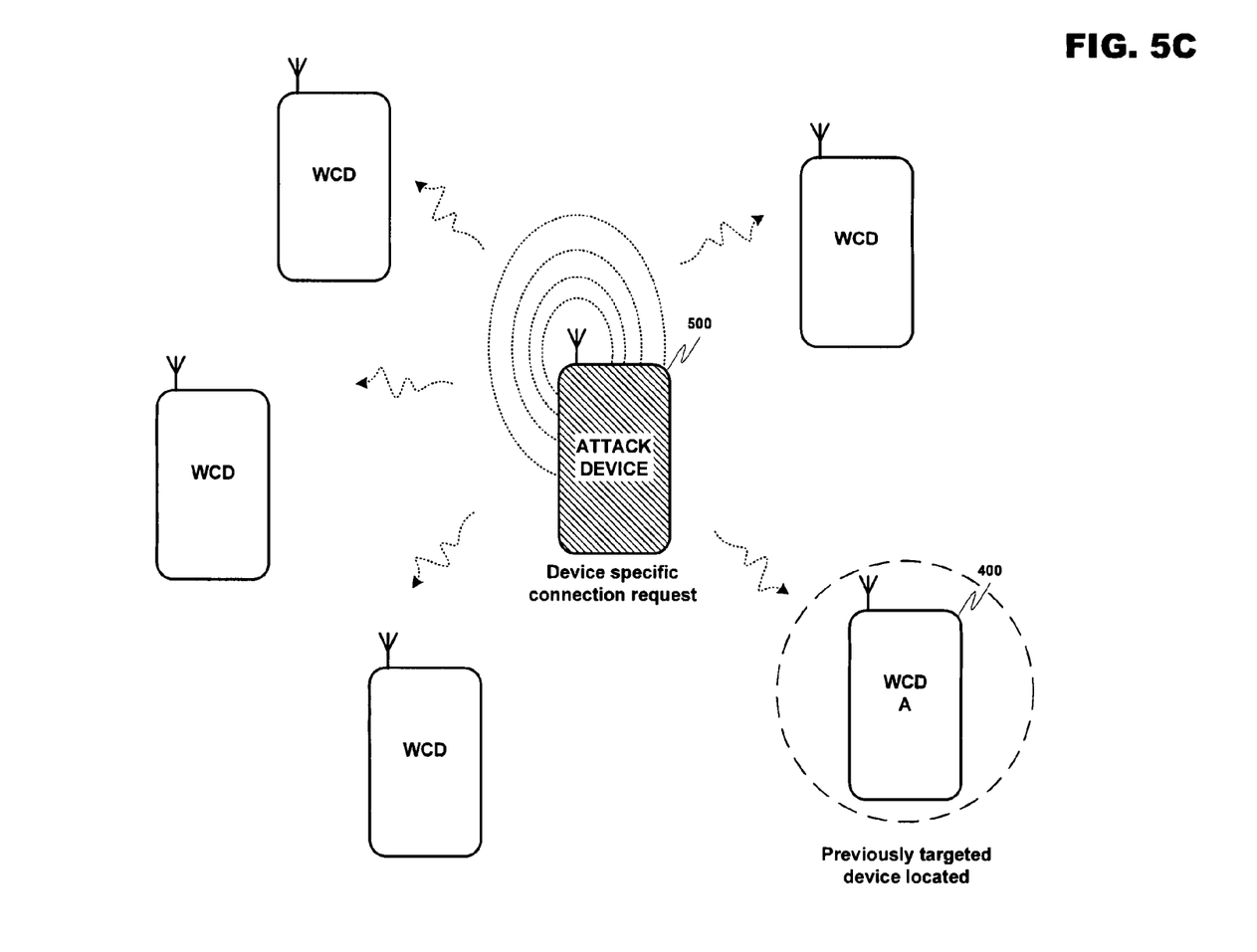
FIG. 5C discloses an example of an active location determination of a wireless communication device by an attacking wireless communication device which is a further motivation for at least one embodiment of the present invention.

An example of attack device 500 employing identification information to track the whereabouts of a WCD A 400 is disclosed in FIG. 5C. In this example, attack device 500 is polling all of the devices within effective transmission range (wherein, the actual distance wireless medium dependant) in order to determine if WCD A is in the area. In the case of Bluetooth™ communication, the range could include over a 300 ft. radius with proper power boosting. If WCD A 400 responds to the poll, attack device 500 may identify WCD A 400 as the desired target device, and notify the user of attack device 500 that a particular target person is within effective transmission range. This information may then be used to commit malicious or hostile acts against the user of WCD A 400.

Figure 6A:
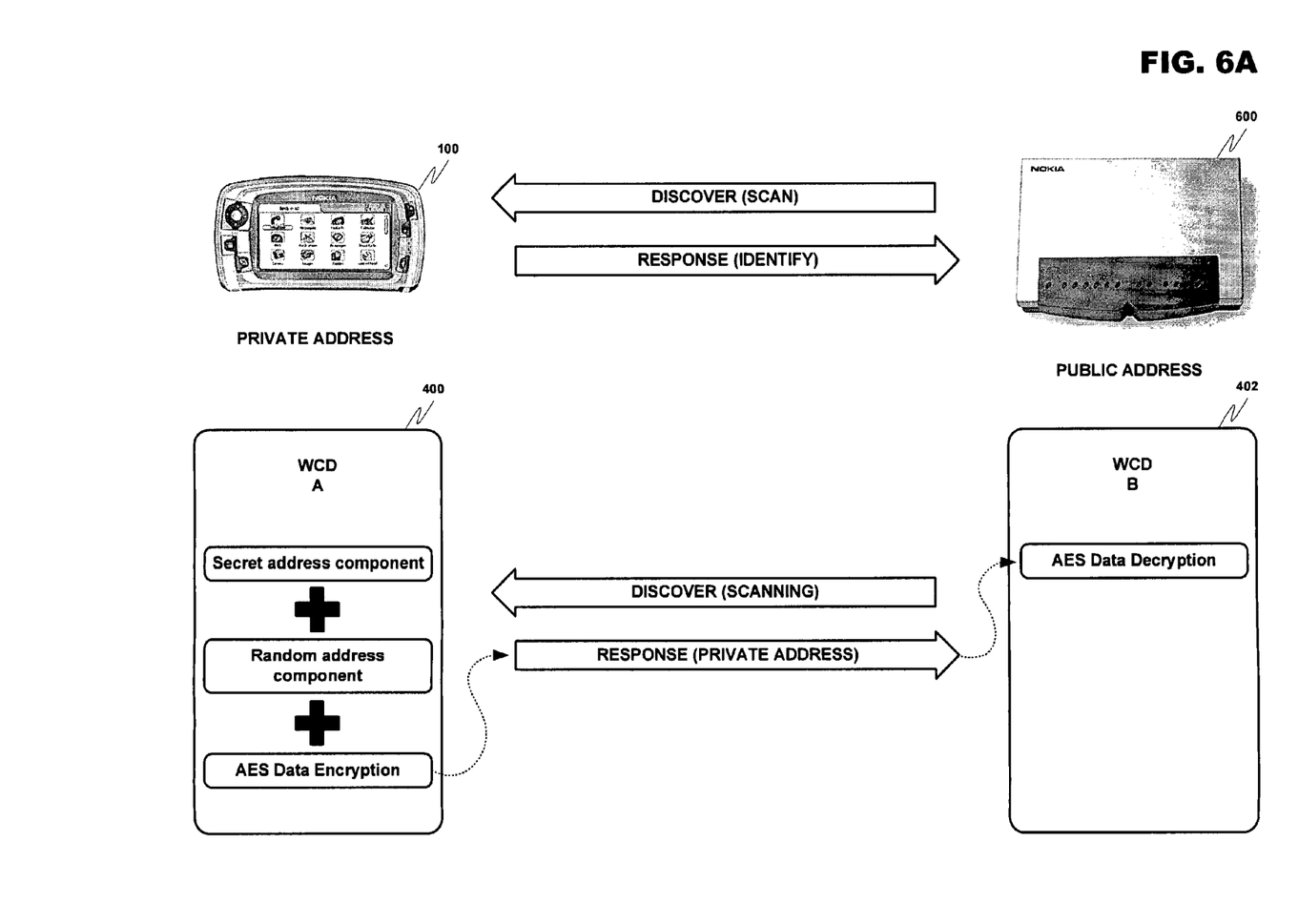
FIG. 6A discloses at least one embodiment of the present invention as it pertains to wireless communication devices that may communicate generally.

IV. Masking the True Identity of a WCD Through a Temporary Pseudo-Random Address An example of at least one embodiment of the present invention with respect to generalized data exchanges between two communication devices is shown in FIG. 6A. In the case of communication over a Bluetooth™-based wireless medium (Standard Bluetooth, BluLite, etc.) discovery will identify at least two types of addresses: public and private. Public addresses are normal, fixed addresses, and may be used in devices like access points (AP), fixed sensors, etc. where there is little or no concern regarding a mobility-based privacy threat. For address entropy purposes (e.g., the degree of randomness in an address while still maintaining a predetermined address quality requirement for a WCD communicating over the particular wireless medium) these addresses may also be generated in the same manner as the private addresses, but they are never changed. Instead, public addresses remain fixed over time so that clients may memorize and reconnect to these devices at a later time (e.g., in the case of a public AP providing wireless Internet service).

In FIG. 6A, AP 600 is shown as having a public address, and may initiate a connection with WCD 100 that uses a private address. AP 600 would want to use an unchanging public address so that other devices (such as WCD 100) may directly address AP 600 without having to poll for all the wireless devices in the area. This may help to conserve power in portable devices like WCD 100 by reducing the amount of discovery required to connect to a known device. On the other hand, while WCD 100 is using a private address, this address conforms to addressing requirements of the particular wireless communication medium (e.g., Bluetooth™), and therefore appears as a normal identification when queried by AP 600.

WCD 100, operating under the previously indicated security concerns, may alter its private address periodically, but not usually during a connection. Allowing a private address to be changed only in an offline mode may be required to reduce baseband complexity, and economize signaling. If there are extremely long-lived connections (for example, a user interface keypad linked wirelessly to a mobile phone) one option may be to automatically trigger the application level or operating system to periodically disable all wireless connections in the WCD for a particular medium, re-randomize the private address, and then re-establish the previously terminated connections.

In discussing the process of address formation, it is assumed that an N-byte network address must be formed to support communication in the wireless medium. The address may be changed in conformance with at least two one-way functions, a cryptographic E( ) function, as well as an radio-entropy-maintaining R( ) function. In view of the fact that many of the emerging wireless communication chipsets are beginning to include built in encryption features (for example, the BluLite chip has a built-in AES encryption block), these already supplied features may be used as the cryptographic one-way function E( )=AES(key, data). For efficiency reasons (pre-image-finding complexity), the actual function may be $$E(key,address)=LOW\_N/2\_BITS(AES(key,LEFT\_N/2\_BITS(address))|LOW\_N/2\_BITS(AES(key,RIGHT\_N/2\_BITS(address))) \quad (1)$$

The key may, in this case, also be considered to be a "not publicly advertised" address, or a secret address component. The constraint of the E( ) function is that the lowest 8 bits of both halves should result in a predetermined number (e.g., 153, which is the smallest decimal number which can be expressed as the sum of cubes of its digits). Note that the halves of the private address may be calculated separately, which may have the effect of improving pre-image finding while still providing a resolution of 216 for discovery (at the cost of requiring occasional key changes).

The radio-entropy-maintaining R( ) function may be defined as follows:

$$c=XOR(LEFTMOST\_NM1\_BITS(address),RIGHT-MOST\_NM1\_BITS(address)) \text{ where nm1=N-1, and} \quad (2)$$

$$R(address)=IF((nb>2)AND(nb<N-1)) \text{ THEN pass ELSE fail where nb=number of 1-bits in c} \quad (3)$$

In function 2 above, the address is XORed with a copy of itself shifted by one. If the number of either bit (1 or 0) is between 2 and N−1 we accept, otherwise reject (function 3).

To summarize the exemplary address generation depicted in additional detail at the bottom of FIG. 6A: WCD A 400 decides on a random 16-byte secret address component (S), which it must keep for future reference. This address can alternatively be described as an identification (ID), as it is not usually used for routing, but primarily for verifying the actual identity of WCD A 400 when a private address is employed. For each newly generated private address it will run two consecutive loops that, on average, may cycle 128 times (for the cryptographic function, the entropy function may add a few cycles) with a close-to normal distribution for the variation. For each loop cycle, the device: randomly selects a N/2-bit random address proposal (P), and then checks whether P fulfills the R( ) function. If the P value does not make the function true, the R( ) function may adjust P to P' (e.g., a radio compatible version of P), or simply restart the loop from the beginning. If/when P satisfies the R( ) function, then K=E(S|P) is calculated. Utilizing the MOD( ) function, if K MOD 256=a predetermined number is true, then half of the private address has been calculated. If not, loop again with a new random P. This process is performed at least twice in the present example in order to yield two random Ps.

The results of the loops: P1 (first loop P) and P2 (second loop P) are then concatenated into the N-bit private address A. As a time estimate for the complete address generation function, for example, wherein an AES encryption block performs one encryption in approximately 10 μs, the full address may be generated in 2-3 ms considering that the AES encryption component is the dominant processing requirement. In addition, as the calculation (except AES) is performed in the system controller (e.g., processor 300), the overhead for address generation should not overtax the overall control system of WCD A 400.

Figure 6B:
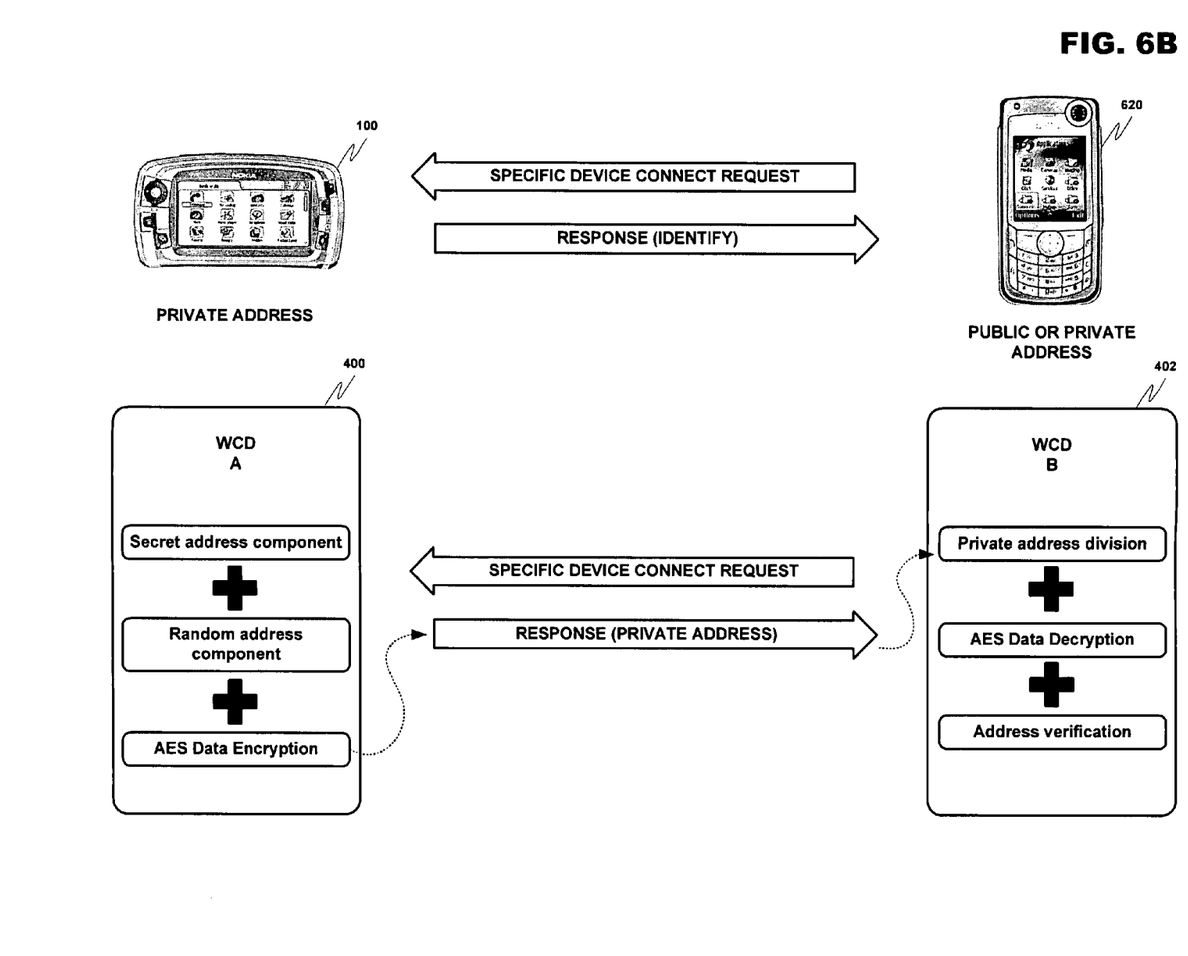
FIG. 6B discloses at least one embodiment of the present invention as it pertains to a wireless communication device searching for a specific target device.

A scenario wherein two devices are communicating wirelessly utilizing private addresses is disclosed in FIG. 6B. When WCD 620 needs to specifically communicate with another known device (such as WCD 100), in a person-to-person (P2P) or possibly device-to-device BluLite setting, there are at least two possible ways of establishing the connection. In one example, the upper layer control software of WCD 620 may first generally scan, whereby addresses of each WCD in the neighborhood may be returned. WCD 620 may then select among the returned addresses for devices to which it wants to connect. Another option is to connect directly to a device, wherein the result of the connect operation is either successful, resulting in a connection being formed, or not (e.g., there is no reply from the other device). In principle, the discovery may work the same way in both cases, but in the latter case, the device resolving may be done completely in the baseband, which requires that the secret address component of the target device is submitted as the connect parameter rather than the default "plaintext=random." In the first-mentioned case, there may be selection logic at work in the application layer, and in that case, the resolving between random and private addresses must be done from that layer.

Before discussing the actual discovery, it is important to establish how a secret address may be distributed between trusted devices. One way is to move it manually or by any out-of-band means between devices that wish to communicate while remaining anonymous. This may occur manually, for example, through a wired connection, a machine-readable NFC medium (e.g., RFID exchange), short-range wireless medium, etc. Alternatively, the transmission of the secret address may be combined with a wireless pairing/key establishment protocol, which may be required for keying purposes. A dedicated version of a keying protocol may be constructed and employed for exchanging secret addresses rather than shared link keys for WCDs that don't need link security, but still want to use the anonymity feature.

When a device (e.g. WCD 620) wishes to connect to a known peer that uses private addresses but for which the secret address is known (e.g. WCD 100), the connecting device must determine all addresses in the neighborhood. For any private address in range, the connecting device will divide the address in two halves, and run the AES decryption over the intended target's secret address component and the halves of the seen private address. If the last byte of the result matches the predetermined number for both operations, the connecting device can be fairly certain that the intended device has been found. If a security context needs to be initiated for the connection, the receiving device will have repeat the procedure for the source address so that both devices may resolve any key material that exists for security establishment. This process is shown at least in part between WCD A 400 and WCD B 402 in FIG. 6B.

The discovery duration will be close to one AES encryption per address pair for "wrong" addresses (the discovery for an address can be aborted after the test for the first part of the private address fails), and two for the correct address. If a general scan is performed of all devices in the area, this procedure has to be done for all pairs of known secret addresses (or more precisely, addresses involved in a current transaction) and seen private addresses, which is fairly heavy for large sets of known or seen addresses, but can be done offline. Applications that need not resolve identity can bypass the whole identification procedure and directly connect based on device class or other equivalent information. In addition, most non-mobile devices that need to be found because of their type (e.g., access points) use public, non-changing addresses which can be connected to directly.

The fact whether a scanned address is public or private can be resolved in one of several manners. The R( ) function may be augmented to require that one specific bit of the visible address is 1 or 0 depending on the address type embedding the information in the address itself. In another example, the ID_RSP PDU (the message that gives the address to the inquiring party) may contain the address type information as a specific control bit in the PDU. Further, the private address may be used as an index to an external (out-of-band) query to resolve the issue. BluLite possibly includes the notion of a "service discovery/resolver" server that is hosted on the Internet. Although the primary task of this server may be to resolve service/profile issues, it may also resolve addresses, and among other things also state whether an address is public or private.

Figure 7:
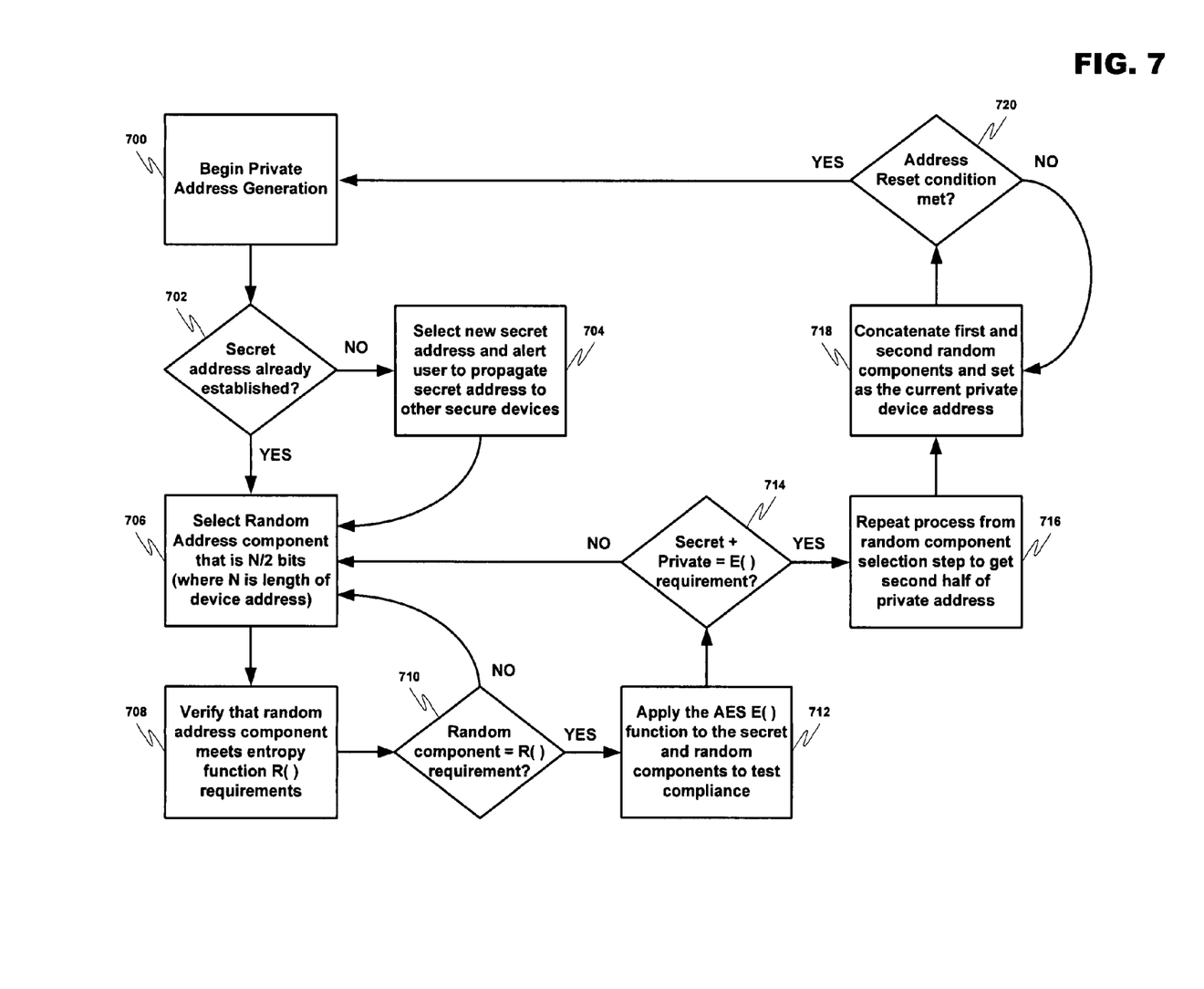
FIG. 7 discloses a flow chart describing a pseudo-random address creation process in accordance with at least one embodiment of the present invention.

Now referring to FIG. 7, a flowchart describing the private address creation process in accordance with at least one embodiment of the present invention is disclosed. The process begins at 700 where private address generation begins. A determination is then made as to whether a secret address component already exists in WCD 100 (step 702). If there is no secret address chosen, a new secret address may be selected at step 704, which must then be distributed to other devices using any of the aforementioned methods for transmitting this information. Next, at 706 a random address component is selected in WCD 100 that is N/2 bits in length (where N is the length of the device address as defined by the particular wireless communication medium). This random address component is then tested using the previously described address entropy R( ) function at 708. If the address component fails the test (step 710) then a new random address component may be selected. If the R( ) function test is successful, then the secret address and random address are concatenated and tested under the E( ) function test in step 712. A failure of the E( ) function test will return the process to 706 to select a new random address component. Passing the E( ) function test will cause the random address component to be retained as R1, and then the process is repeated from step 706 to obtain a second random address component R2 (step 716).

The R1 and R2 components may then concatenated in step 718 to yield a private address. This address may be used to communicate with other devices while masking the actual identity of the WCD. Further, a reset condition is checked in step 720 to determine whether to recompile a new random address. The reset condition may be triggered by a certain time (e.g., a time of day), a duration of current private address use, a number of connections to other devices using the current private address, etc. When the reset condition is triggered, WCD 100 may temporarily enter an offline state for at least the specific wireless communication medium corresponding to the address that requires recompilation. The private address may then be recreated in accordance through any or all of the previously disclosed process steps.

Figure 8:
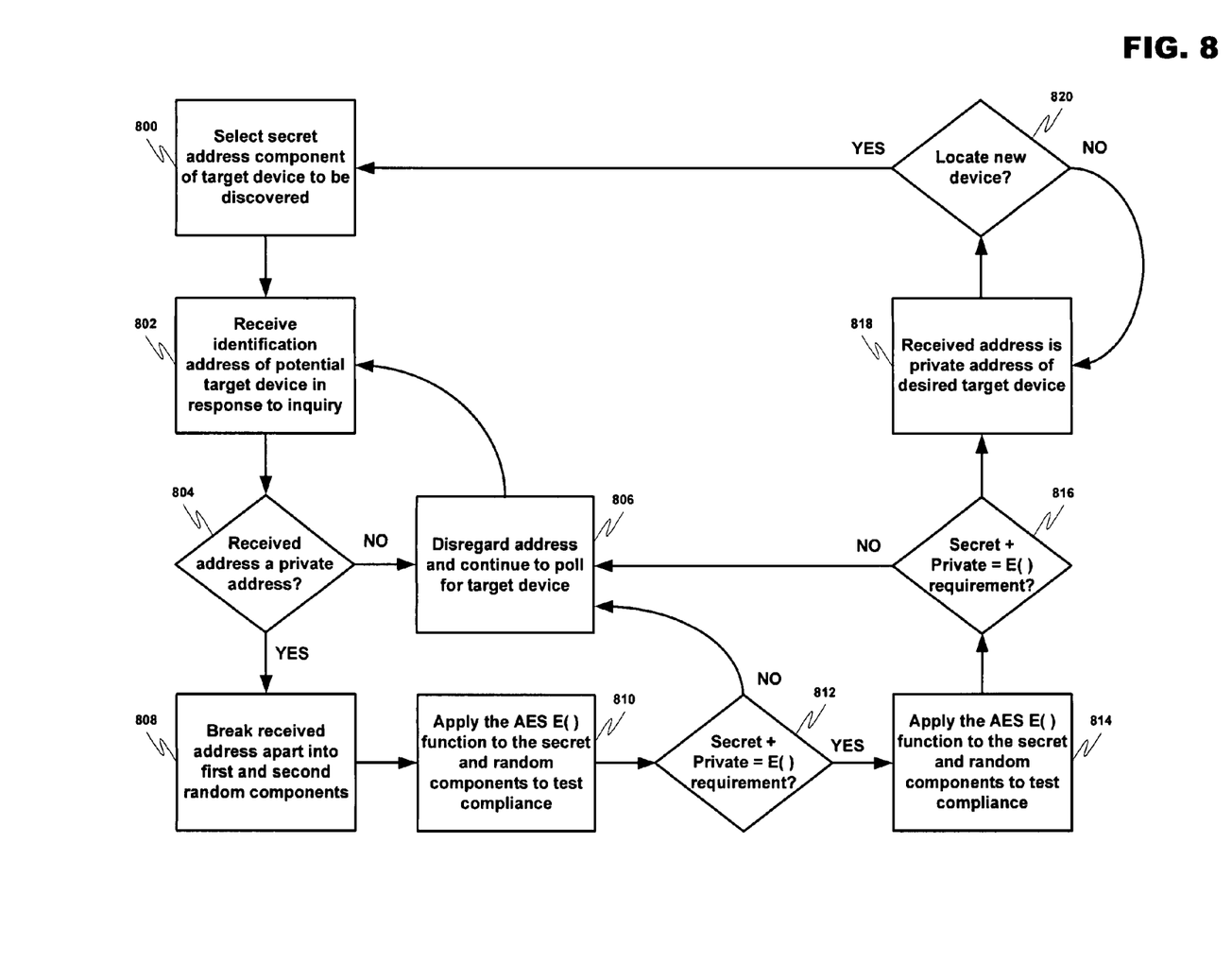
FIG. 8 a flow chart describing a pseudo-random address testing process in accordance with at least one embodiment of the present invention.

FIG. 8 further discloses a process flow chart that may be used by a polling device in order to decipher and verify the private address of a potential target device in accordance with at least one embodiment of the present invention. The secret address of a device to be located is selected in step 800. This address may be delivered to the searching device through one of the previously described communication methods. The searching WCD 620 then proceeds to search out other WCDs within transmission range in order to obtain their identifying addresses (step 802). A determination may then be made in step 804 as to whether the received address is a public or private address. This determination may include checking a signal, such as a bit set in a predetermined state within the identification address or in a separate identification packet. If the address is a public address, the searching WCD disregards the found device and continues polling for additional devices in step 806. Otherwise, if the address is a private address, the process proceeds to step 808 where the private address is split into at least two random address components.

The searching device tests the random address components in step 810. The first random address component is concatenated with the known secret address component of the WCD being sought, and the combined components are checked against the AES E( ) function requirement. If this test fails in step 812, the searching device knows that this is not the correct device and may immediately reinitiate polling in step 806. Alternatively, if the result of the MOD function does equal a predetermined number like 153 (as previously described), then the searching WCD 620 may test the second random address component in step 814. If the second random address component fails the test, then the searching device may resume polling in step 806. On the other hand, if the second random address component does pass the AES E( ) function test, then this is a strong indication that the currently connected device is the device being sought (step 820), and the searching device may communicate with this particular WCD. If another known (e.g., the secret address component is known) device is to be sought, the search process reinitiates in step 820.

V. Alternative Embodiment

In an alternative example of the present invention, less address resolution may be performed in order to save on device resources and to increase the speed of the process. The private address in this embodiment may be constructed in the following manner: One half of the private address (H1) is random and fed through the R( ) function (it is assumed here that enough address entropy can be achieved by modifying half of the address only), and the other half of the private address is constructed as a part of the result of the operation.

$$H2 = E(\text{secretaddress}, 0|H1) \qquad (4)$$

In this example, H1 and H2 are then combined to form the private address. There is no trial and error in the address construction, and the resolution of the address is N/2, where N is the bit length of the address as determined by the wireless communication medium. A limitation in this embodiment, as compared to the one previously described, is that the entropy-related R( ) function cannot be allowed operate over the entire address, which may be significant for short addresses (e.g., 30 bits or less). This restriction may be lifted if the R( ) function is self-correcting, R( ) can be applied after encryption, and the receiving device (knowing the self-correcting R( ) function) can apply it prior to testing a received address. The same result could also be achieved by looping over the R( ) function with different inputs until a satisfactory result is achieved. The advantage of the latter solution is that the generation of the address might be more deterministic in time. Overall, the solutions may have fairly similar properties, although the mechanisms differ slightly.

VI. BluLite Integration

As a security application for BluLite implementation, the integration requirements of the present invention for the baseband are slight. Most of the activity may be handled in the application layer. For address generation there is already an AES hardware block interface designed for the ULIF (upper layer interface). The generation may follow the simple algorithm defined above.

In device discovery, one of the address type-resolving methods previously described above may be applied. The choice may include an interpreter at the application layer, however the ID and ID_RSP PDU may then require an extra bit. For connection, two choices are possible, and can be implemented in parallel. The lightweight option is to SCAN as "normal", resolve the address type, and in the case of private addresses, resolve the identity behind the address if the connection is to be established. This logic may be completely deployed at the application layer, and even in the case of private addresses, the connection establishment may proceed by simply using the private address for which the identity has been determined. An optimization for direct connects is to provide the target ID (Secret Address) to the baseband, wherein the previously described algorithm is performed in the baseband for one specific target address only.

The present invention presents a novel improvement over the prior art of record. Security for a wireless communication device may be enhanced by continuously reforming a temporary pseudo-random masking address which hides the actual address of the device. In this way, the actual hard-coded address of the device may never be known to other devices, which may in turn prevent an attacking device from obtaining important device/user information. Any address obtained by an attacking device is changed periodically, and therefore, any traceability of a user's WCD as it transacts using a wireless communication medium is nullified.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
    maintaining a secret address component associated with an identity in a wireless communication device;
    providing the secret address component to all member devices of a group of trusted wireless communication devices;
    creating a temporary pseudo-random address in the wireless communication device based on the secret address component; and
    hiding the identity of the wireless communication device by utilizing the temporary pseudo-random address as a temporary private address when advertising the presence of the wireless communication device, wherein the member devices can determine the identity of the wireless communication device by resolving the identity from the pseudo-random address using the secret address component.

2. The method of claim 1, wherein both the temporary pseudo-random address and the actual address of the wireless communication device are usable to identify the wireless communication device over the same wireless communication medium.

3. The method of claim 1, wherein the temporary pseudo-random address is composed of at least two separate pseudo-random elements concatenated together.

4. The method of claim 1, wherein resolving the identity comprises testing the temporary pseudo-random address to determine if it meets an entropy requirement by the wireless communication device.

5. The method of claim 1, wherein resolving the identity comprises testing the temporary pseudo-random address to determine if it meets an encryption requirement by the wireless communication device.

6. The method of claim 1, wherein the temporary pseudo-random address includes a signal that indicates that the address is a temporary pseudo-random address.

7. The method of claim 6, wherein the signal is a bit in the temporary pseudo-random address set in a predetermined state.

8. The method of claim 6, wherein a device in the group of trusted wireless communication devices determines that a received address is a temporary pseudo-random address by reading the signal.

9. The method of claim 1, wherein a device in the group of trusted wireless communication devices resolves the identity by dividing the temporary pseudo-random address into at least two parts and testing each part.

10. The method of claim 9, wherein the identity of the wireless communication device is confirmed when all of the at least two parts of the pseudo-random address pass the test.

11. The method of claim 1, wherein the pseudo-random address may be changed when an address reset condition has been triggered.

12. A wireless communication device comprising:
    at least one processing apparatus; and
    at least one memory including executable instructions, the at least one memory and the executable instructions being configured to, in cooperation with the at least one processing apparatus, cause the device to perform at least the following:
    maintain a secret address component associated with an identity in a the wireless communication device;
    provide the secret address component to all member devices of a group of trusted wireless communication devices;
    create a temporary pseudo-random address in the wireless communication device based on the secret address component; and
    hide the identity of the wireless communication device by utilizing the temporary pseudo-random address device identification for as a temporary private address when advertising the presence of the wireless communication device, wherein the member devices can determine the identity of the wireless communication device by resolving the identity from the pseudo-random address using the secret address component.

13. The device of claim 12, wherein both the temporary pseudo-random address and the actual address of the wireless communication device are usable to identify the wireless communication device over the same wireless communication medium.

14. The device of claim 12, wherein the temporary pseudo-random address is composed of at least two separate pseudo-random elements concatenated together.

15. The device of claim 12, wherein the temporary pseudo-random address includes a signal that indicates that the address is a temporary pseudo-random address.

16. The device of claim 15, wherein the signal is a bit in the temporary pseudo-random address set in a predetermined state.

17. A computer program product comprising computer executable program code recorded on a computer readable storage medium, the computer executable program code comprising:
   code configured to cause a wireless communication device to maintain a secret address component associated with an identity in the wireless communication device;
   code configured to cause the wireless communication device to provide the secret address component to all member devices of a group of trusted wireless communication devices;
   code configured to cause the wireless communication device to create a temporary pseudo-random address based on the secret address component; and
   code configured to cause the wireless communication device to hide the identity by utilizing the temporary pseudo-random address as a temporary private address when advertising the presence of the wireless communication device, wherein the member devices can determine the identity of the wireless communication device by resolving the identity from the pseudo-random address using the secret address component.

18. The computer program product of claim 17, wherein both the temporary pseudo-random address and the actual address of the wireless communication device are usable to identify the wireless communication device over the same wireless communication medium.

19. The computer program product of claim 17, wherein the temporary pseudo-random address is composed of at least two separate pseudo-random elements concatenated together.

20. The computer program product of claim 17, wherein resolving the identity comprises testing the temporary pseudo-random address to determine if it meets an entropy requirement by the wireless communication device.

21. The computer program product of claim 17, wherein resolving the identity comprises testing the temporary pseudo-random address to determine if it meets an encryption requirement by the wireless communication device.

22. The computer program product of claim 17, wherein the temporary pseudo-random address includes a signal that indicates that the address is a temporary pseudo-random address.

23. The computer program product of claim 22, wherein the signal is a bit in the temporary pseudo-random address set in a predetermined state.

24. The computer program product of claim 22, wherein a device in the group of trusted wireless communication devices resolves the actual address by dividing the temporary pseudo-random address into at least two parts and testing each part.

25. The computer program product of claim 17, wherein a device in the group of trusted wireless communication devices tests the temporary pseudo-random address by dividing the temporary pseudo-random address into at least two parts and testing each part.

26. The computer program product of claim 25, wherein the identity of the wireless communication device is confirmed when all of the at least two parts of the pseudo-random address pass the test.

27. The computer program product of claim 17, wherein the pseudo-random address may be changed when an address reset condition has been triggered.

28. A chipset usable for wireless communication, comprising:
   at least one processing module; and at least one communication module;
   the processing module, alone or in combination with the communication module, being configured to:
   maintain a secret address component associated with an identity in a wireless communication device;
   provide the secret address component to all member devices of a group of trusted wireless communication devices;
   create a temporary pseudo-random address in the wireless communication device based on the secret address component; and
   hide the identity of the wireless communication device by utilizing the temporary pseudo-random address as a temporary private address when advertising the presence of the wireless communication device, wherein the group member devices can determine the identity of the wireless communication device by resolving the identity from the pseudo-random address using the secret address component.

29. A system comprising:
   a target wireless communication device;
   a group of trusted wireless communication devices;
   the target wireless communication device maintaining a secret address component associated with an identity in a wireless communication device and providing the secret address component to all member devices of the group of trusted wireless communication devices;
   the target wireless communication device further hiding the identity of the target wireless communication device by utilizing the temporary pseudo-random address in as a temporary private address when advertising the presence of the wireless communication device;
   at least one device from the group of trusted devices requesting an address from the target communication device;
   the at least one device from the group of trusted devices further receiving the pseudo-random address and verifying the identity of the target wireless communication device by resolving the identity from the pseudo-random address using the secret address component.

* * * * *